Oct. 11, 1955     J. L. GRATZMULLER     2,720,220
GAS-LIQUID ACCUMULATORS AND THE LIKE
Filed Nov. 14, 1950                                      2 Sheets-Sheet 1

Inventor
J. L. Gratzmuller
By Hancock Downing Seebold
Attys

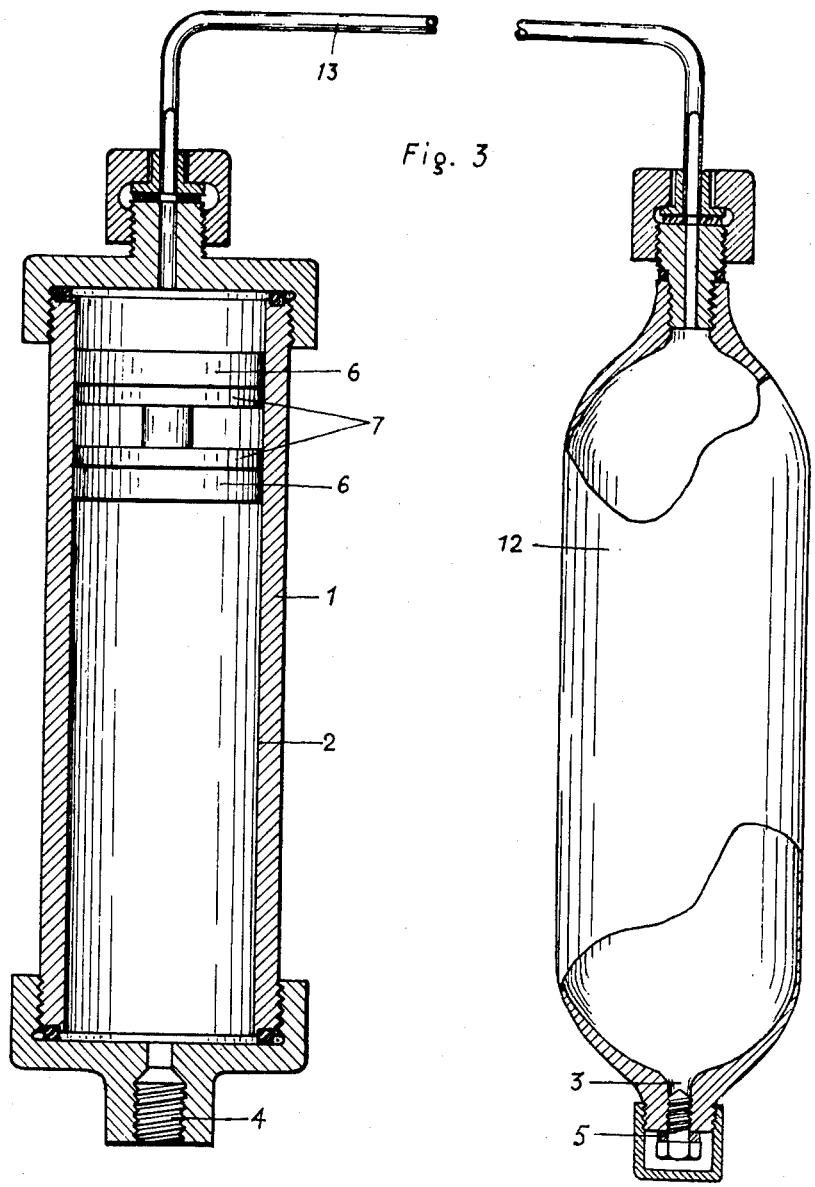

United States Patent Office

2,720,220
Patented Oct. 11, 1955

2,720,220

GAS-LIQUID ACCUMULATORS AND THE LIKE

Jean Louis Gratzmuller, Paris, France

Application November 14, 1950, Serial No. 195,543

Claims priority, application France November 28, 1949

3 Claims. (Cl. 138—31)

This invention relates to pistons for separating a gaseous fluid from a liquid under pressure and to hydraulic accumulators incorporating such a piston.

A frequently used type of hydraulic accumulator is that in which a gaseous medium is separated from the liquid medium by a diaphragm which is generally made of synthetic rubber.

In accumulators of small capacity, this solution generally gives satisfactory results. However, for accumulators of large capacity, gas-filled bladders are usually resorted to which, apart from a more or less pronounced gas permeability under a high pressure, offer the serious drawback of liability to accidental puncturing or bursting. With such accumulators, failure may occur, very possibly at the precise moment when the stored energy is required. Moreover, the manufacture of the bladders gives rise to complex industrial problems.

This invention has for its object to provide an air and oil or more broadly a gas and liquid hydraulic accumulator of any desired capacity in which risk of failure is remote, which is simple to manufacture and is of very low cost, and entailing no serious difficulties of constructive assembly.

To achieve this object an accumulator according to the invention incorporates a piston of a particular kind for separating the gaseous and liquid media, and the uses of such a piston are not confined to hydraulic accumulators, but extend to any apparatus in which a freely movable piston separates a gaseous medium from any liquid medium having an appreciable volumetric compressibility, both fluids being under pressure.

A free piston according to the invention comprises two rigidly interconnected faces separated by a space and each provided with packing means cooperating with the wall of the cylinder in which the piston slides, that of the face in contact with the liquid being adapted to allow the liquid to penetrate into the space between the piston faces, while the packing means of both faces are adapted to prevent the liquid from escaping from the said space.

The accumulator according to the invention is constituted by a hollow cylindrical body closed at both ends, one of these ends being provided with a gas port and the other end being provided with a liquid port, a piston slidably mounted in the bore of said body, the piston being constructed and operating in the manner set forth in the preceding paragraph.

By reason of this arrangement which ensures effective separation between the compressed gas and the liquid (hereinafter referred to for convenience as "oil"), it is only necessary first to pump compressed oil into the accumulator through said liquid port until the piston is driven to the end of the cylinder remote from that through which said oil is admitted and until the inner space of the piston is completely filled by the oil penetrating past the nearer of the piston faces, as explained above, and subsequently to admit the compressed gas into the cylinder through said gas port while permitting the oil to escape through said liquid port. Experiments have confirmed that when the above described device is operated in the above mentioned manner, it is possible owing to the volumetric compressibility of the oil to fill the piston with oil at a pressure exceeding the maximum pressure that may be attained by the gas admitted into the cylinder, thanks to which said gas is prevented from penetrating into the piston, and is thus separated from the oil by an effective seal.

It is to be understood that the packings provided in the neighbourhood of the two piston faces may be constructed in any manner and may be either simple or multiple, which explains the term "packing sets" as used above, the only required condition being that the packings must allow the oil to penetrate into the hollow space of the piston while preventing said oil from escaping in either direction.

The principle of the invention is to utilize the volumetric compressibility of the liquid itself to ensure that the liquid on one side of the piston is effectively separated from the gaseous fluid on the other side of the piston.

Experiments have shown that perfect sealing was obtained with cylinder bores subjected to no special finishing treatment and with packings of simple construction, so that the whole accumulator can have a very low cost.

It is pointed out, moreover, that this accumulator may be mounted and loaded very rapidly and that no substance other than the above mentioned gas and liquid needs to be introduced into the accumulator.

It is to be understood that if during the operation of the accumulator the oil pressure within the piston were to decrease at any moment, this pressure would be reset to the desired value during the next loading operation. This is due to the fact that when the piston is driven forward by the oil delivered by the pump into the accumulator and compresses the gas, the oil side pressure is higher than the gas side pressure, this being a sine qua non condition of the forward motion of the piston, since this pressure difference is necessary to overcome the friction of the packings against the cylinder wall.

Once the load pressure is reached, pumping is stopped and the gas, the temperature of which has risen during the compression stroke, begins to cool down, and consequently its pressure decreases somewhat. Thus, it will be understood that in the loaded condition of the accumulator, the oil pressure within the piston is always higher than the gas pressure. It results therefrom that the accumulator may remain loaded as long as desired without any possibility of air penetration into the piston as long as the accumulator remains in loaded condition.

During the discharge of the accumulator, the gas pressure decreases continuously. To prevent the gas from penetrating into the piston, it is only necessary that the oil pressure in the piston decreases more slowly than the gas pressure.

To meet this condition, the invention contemplates the utilization of the volumetric compressibility of oil. It has been observed that at the relevant pressures, the oil is somewhat compressible. Due to this compressibility, the slight oil losses which may take place from the hollow space of the piston during the discharge stroke thereof are limited to such values that the decrease of the oil pressure in the hollow space of the piston, at any moment during the discharge stroke, is actually always less than the corresponding fall of gas pressure.

The experiments made for checking this has shown that the conditions of relative pressure decreases in the piston and within the gas mass can be met very easily, even with very simple packings and with only rough machining of the cylinder bore.

It will be easily understood that an hydraulic accumulator according to the invention may have any desired capacity without running into any constructional difficulties.

In a modification of the invention, in order to reduce the accumulator weight, that end of the cylinder, which receives the gaseous medium, is connected with a gas-cylinder or any other compressed gas container filled with a gas at required pressure, the assembly comprising said container and the cylinder enclosing the piston which constitutes the accumulator proper. With this arrangement, when the accumulator is loaded, the oil may occupy the whole cylinder capacity while the air cushion fills the container which may be of lighter construction than the cylinder itself since it may be given a more advantageous shape for resisting internal pressure.

It is particularly contemplated to use piano-wire wound aluminium containers the use of which has given excellent results and the weight of which is very low.

Due to the very nature of the separation between the two media in the accumulator according to the invention, there is no disadvantage in combining the cylinder in which the separating piston slides with an extraneous container. This construction enables accumulators of very great capacity, low weight, simple construction and excellent sealing characteristics to be provided.

The invention thus includes an hydraulic accumulator comprising, in combination, a cylindrical body in which slides a free hollow piston filled with the working liquid and a compressed gas container connected with the gas side of said cylindrical body and constituting a gas chamber for the latter.

The invention will be more easily understood with reference to the accompanying drawings in which two embodiments of the invention are illustrated by way of example only.

In these drawings:

Fig. 3 is a longitudinal sectional view of another embodiment in which the accumulator is connected with an auxiliary compressed gas container.

In all figures, the corresponding parts have been designated by the same reference numeral.

Figure 1:
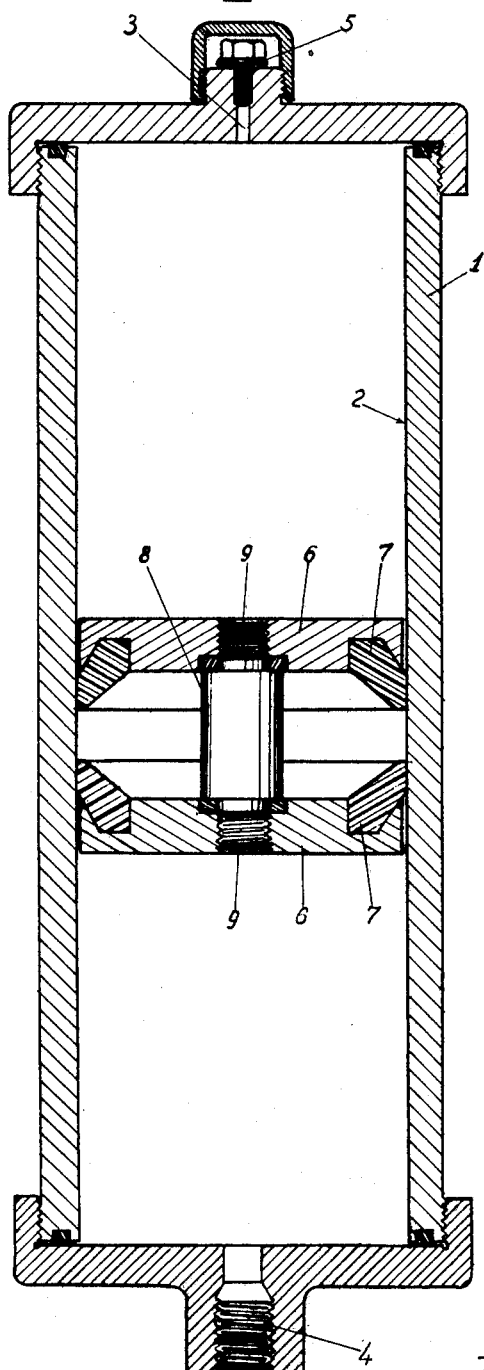
Fig. 1 is a longitudinal sectional view of an air and oil accumulator according to the invention.
Figure 2:
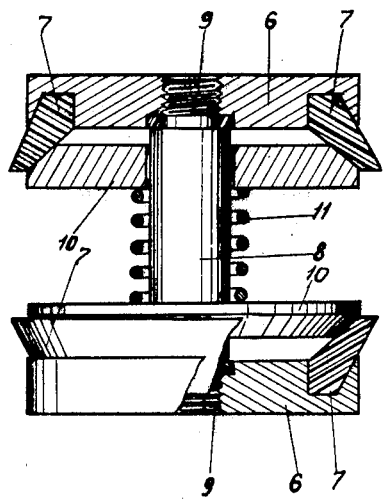
Fig. 2 is a longitudinal sectional view of the piston of said accumulator.

In the example shown in Fig. 1 the air and oil accumulator comprises a body 1 provided with a cylindrical bore 2 closed at both ends, an air port 3 being provided in one of the ends and an oil port 4 in the other. The air port 3 is closed by a plug 5 protected by a cap which may be removed and replaced by a conventional inflating head which, as known, permits unscrewing of plug 5 after having connected the accumulator with a source of pressure gas and screwing plug 5 up again without breaking this connection. The accumulator piston more clearly shown in Fig. 2, is constituted by two rigid discs 6—6, each of which carries a packing 7. Discs 6—6 are interconnected by a rod 8 threaded at both ends, said ends being screwed as shown at 9 into threaded bores of the discs 6. An annular hollow space is thus provided between discs 6.

This device may be completed by means for applying the lips of the packings against the cylinder wall, such means being constituted, e. g. by two washers 10 each of which is pressed upon one of the packings 7 by means of a helical spring 11 surrounding rod 8 between the washers 10.

It will be seen that the packings 7 are so designed that they allow the oil to penetrate into, while preventing it from escaping from the above mentioned hollow space.

In Fig. 3 there is shown at 12 an auxiliary compressed gas container connected as shown at 13 with accumulator 1. In this embodiment, the air port 3 is provided at the opposite end of container 12 to connection 13.

The loading of the accumulator is effected as follows:

Oil is pumped through port 4 into the cylinder. The piston is driven towards the other end of the cylinder and filled with oil, packing 7 permitting the oil to enter the hollow space of the piston as mentioned above. Pumping is continued until the oil reaches a predetermined maximum value. A compressed gas source is then connected with port 3 through a conventional inflating head, as described above, while oil is allowed to escape through port 4 and this is continued until the cylinder is completely emptied of its oil, except for that contained in the hollow piston. The compressed air source may then be disconnected, after port 3 has been closed to seal the gas space of the accumulator. It is then sufficient to pump oil into the acumulator again, thus compressing the air up to the desired pressure, to complete the loading of the accumulator.

The accumulator according to the invention meets satisfactorily the two working conditions of a liquid or gas accumulator, i. e. the separation between the two fluids and sealing against leakage of the gaseous fluid when the discharge outlet of the liquid remains in opened position after expulsion of the whole amount of the liquid contents of the accumulator.

The first condition is met as described above, and the liquid enclosed within the piston resists the passage of the gaseous fluid when the pressure is reduced to zero in the liquid compartment. Therefore, the packing sets need to be liquid-tight only and it is thus possible to avoid the use of special gas-tight packings and any valve system.

What is claimed is:

1. A gas-liquid power accumulator of the type in which the power accumulating medium is constituted by a pressure gas, the pressure of which is to be transmitted to a working liquid, comprising a hollow cylindrical body closed at both ends, one of said ends being provided with a gas port, and the other end being provided with a liquid port, two piston faces in said hollow body, means to rigidly interconnect said piston faces, while providing an unvented space of constant volume between them, and packing means between each piston face and the inner wall of said hollow body, the liquid side packing means being formed to let said liquid penetrate into said space and to prevent said liquid from escaping out of said space.

2. A hydraulic accumulator comprising a cylinder and a piston therein, the cylinder space on one side of said piston being adapted to contain a gaseous fluid under pressure and the cylinder space on the other side of said piston being adapted to contain a hydraulic fluid under pressure, said piston comprising two head members and a rod interconnecting said head members to provide an unvented chamber of constant volume between them, an annular groove provided with an outwardly tapered edge formed on the inner side of each of said head members, an annular lip shaped cylindrical packing element located in each of said grooves, two seal-compressing rings slidably mounted on said rod, and a spring located between said compressing rings to exert on both packing elements a pressure applying the lips thereof against the inner wall of said cylinder, whereby said packing elements will form an efficient seal with said cylinder wall under the action of pressure fluid entering said chamber past said packing elements against the action of said spring.

3. In a cylinder, a free piston separating a space for receiving a hydraulic fluid from a space for receiving a gaseous fluid, both the hydraulic and the gaseous fluids being under pressure, said piston comprising two piston heads, means rigidly interconnecting said piston heads while providing an unvented space of constant volume between them, and packing means between each piston head and the inner wall of the cylinder, both said packing means being formed to prevent the hydraulic fluid from escaping from the said unvented space, and the packing means on the hydraulic fluid side of the piston being formed to allow the hydraulic fluid to enter the said unvented space.

(References on following page)

References Cited in the file of this patent

UNITED STATES PATENTS

| | | |
|---|---|---|
| 1,901,606 | Marsh | Mar. 14, 1933 |
| 2,004,669 | Miller | June 11, 1935 |
| 2,056,076 | Le Blanc | Sept. 29, 1936 |
| 2,160,357 | Hammer | May 30, 1939 |
| 2,193,983 | Read | Mar. 19, 1940 |
| 2,352,041 | Van Den Berg | June 20, 1944 |
| 2,411,229 | Pratt | Nov. 19, 1946 |
| 2,417,256 | Kremiller | Mar. 11, 1947 |
| 2,440,065 | Ashton | Apr. 20, 1948 |

FOREIGN PATENTS

| | | |
|---|---|---|
| 361,210 | Great Britain | Nov. 19, 1931 |